United States Patent [19]

Horii et al.

[11] 4,300,117
[45] Nov. 10, 1981

[54] ALARM DEVICE FOR AN ODOMETER

[75] Inventors: Hirokazu Horii, Ooi; Koji Sasai, Yokohama, both of Japan

[73] Assignee: Nissan Motor Company, Limited, Kanagawa, Japan

[21] Appl. No.: 97,633

[22] Filed: Nov. 27, 1979

[30] Foreign Application Priority Data

Dec. 29, 1978 [JP] Japan .......................... 53-178877[U]

[51] Int. Cl.³ .................... B60Q 1/00; G01C 22/00; G06F 15/18
[52] U.S. Cl. .................. 340/52 D; 200/56 R; 200/61.58 R; 235/97; 235/132 E; 340/688
[58] Field of Search ................ 340/52 D, 53, 688; 235/95 R, 96, 97, 132 E; 200/56 R, 61.58 R, DIG. 21

[56] References Cited

U.S. PATENT DOCUMENTS

| 1,812,576 | 6/1931 | Wray et al. | 200/DIG. 21 |
| 1,919,493 | 7/1933 | Zubaty | 235/96 |
| 2,492,408 | 12/1949 | Willcox | 200/56 R |
| 2,578,358 | 12/1951 | Jellison | 235/96 X |
| 3,856,195 | 12/1974 | Kakizaki et al. | 235/97 |
| 3,925,754 | 12/1975 | Ota et al. | 340/52 D |

Primary Examiner—John W. Caldwell, Sr.
Assistant Examiner—Joseph E. Nowicki
Attorney, Agent, or Firm—Lowe, King, Price & Becker

[57] ABSTRACT

To an odometer which has two parallel shafts, one being fitted with a plurality of distance-indicating wheels, while the other is fitted with a plurality of carry pinions which actuate said distance-indicating wheels, is fitted an alarm device, which comprises a means for triggering, which rotates together with one of said carry pinions, and an alarm switch, which is actuated by said means for triggering when it reaches a certain predetermined position during its movement together with its carrying pinion.

9 Claims, 6 Drawing Figures 4,300,117

ALARM DEVICE FOR AN ODOMETER

BACKGROUND OF THE INVENTION

This invention relates to an alarm system, and more particularly relates to an alarm system which issues an alarm when a vehicle fitted with an odometer has traveled a certain predetermined distance.

Such alarms are desirably fitted to modern vehicles for a variety of reasons. For instance, in the U.S.A. nowadays many, vehicles are fitted with oxygen sensors which have to be checked every 30,000 miles. Thus an alarm device is needed for warning the driver that this predetermined distance has been traversed.

In FIG. 1 of the accompanying drawings is shown a conventional type of alarm system of this sort. The drive gear 31 of the conventional odometer 30 is provided with a projection 34 which engages with a microswitch 36 and actuates it each time the drive gear 31 rotates. That is, the drive gear 31 is engaged with the rotating shaft 32 of which rotation is transmitted to the wheel 33-1, and subsequently to the wheels 33-2 through 33-6. The boss 31a on the drive gear 31 is provided with the projection 34. A microswitch 36 is provided on the frame 35, so that at each rotation of the drive gear 31 the projection 34 may press the contact 36a of the microswitch 36. The counter 37 counts the number of times the microswitch 36 is actuated, and when this number reaches a certain predetermined number the light 38 is lit, indicating that the vehicle has covered the predetermined mileage.

Such a system is expansive to make, because the counter 37 must be provided; and furthermore the counter 37 requires some space.

SUMMARY OF THE INVENTION

Therefore, it is an object of the present invention to provide an alarm system for an odometer which is cheaper to make, and which requires less space.

According to the present invention, this and other objects are accomplished, in an odometer which comprises two parallel shafts, a plurality of distance-indicating wheels mounted on one of the shafts, and a plurality of carry pinions mounted on the other shaft which actuate said distance-indicating wheels, an alarm device, comprising a means for triggering, which rotates together with one of said carry pinions, and an alarm switch, which is actuated by said means for triggering when it reaches a certain predetermined position during its movement together with its carry pinion.

BRIEF DESCRIPTION OF THE DRAWINGS

The present invention will become more clearly understood from the following description of several preferred embodiments thereof, and from the appended drawings, which, however, are none of them intended to limit the present invention in any way, but are given purely for the purposes of explanation, elucidation, and enlightenment only. In the drawings.

DESCRIPTION OF THE PREFERRED EMBODIMENTS

Figure 1:
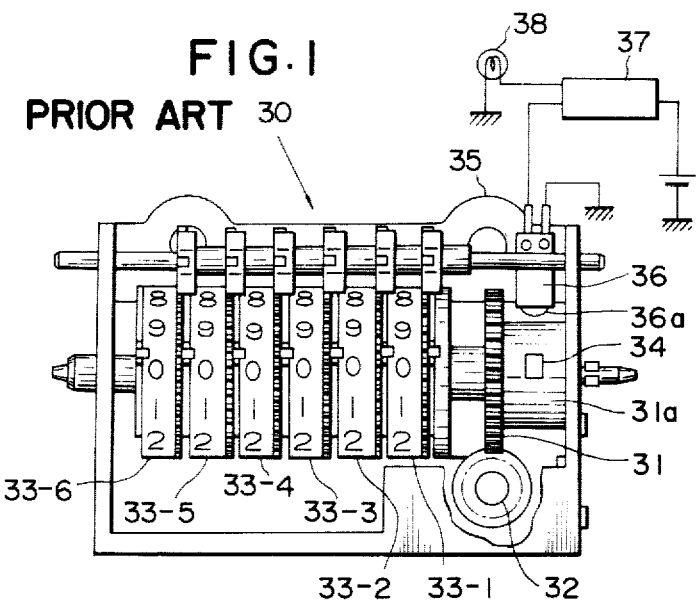
FIG. 1 is a plan view of a conventional alarm system.
Figure 2:
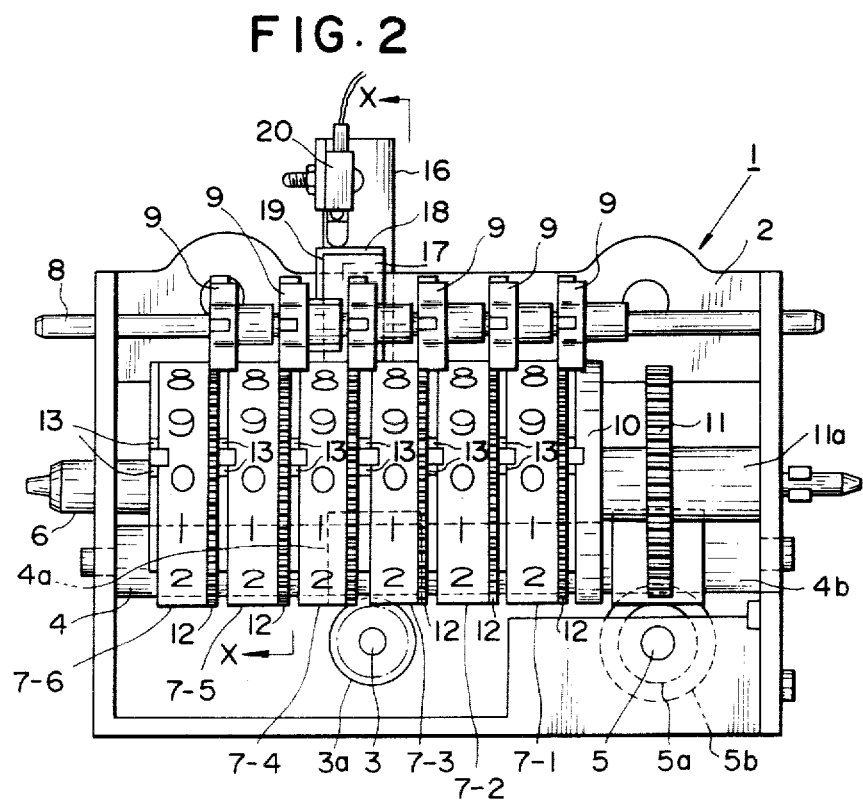
FIG. 2 is a plan view of an alarm system according to the present invention.

The odometer 1 to which the alarm system of the present invention is to be fitted is conventional, and does not require any detailed explanation. Briefly, this odometer comprises two parallel shafts 6 and 8. The shaft 6 has fitted on it a plurality of distance-indicating wheels 7-1 . . . 7-6, and the shaft 8 has fitted on it a plurality of carry pinions 9 for carrying from one distance-indicating wheel 7 to the next, in a per se well known way, which interact with the toothed wheels 12 and the double pins 13. The assembly is driven by a driving wheel 10 and a drive gear 11, to which rotational movement is imparted by a sequence of shafts 3, 4, 5, and toothed wheels and/or worms, whose details are not of importance in this connection. Such an odometer indicates the ongoing mileage traveled by the vehicle to which it is fitted.

According to the present invention, on one of the carry pinions 9 is provided a triggering means. For instance, in the illustrated embodiment this triggering means is a cutaway on the boss 14 of the pinion, designated by 15 in FIG. 3. On the frame 2 of the odometer is fixed a bracket 16, and a leaf spring 17 is fixed by its one end to this bracket 16, its other end 18 being provided with a protruding portion 19 which is engaged with the boss 14, by the biasing action of the leaf spring 17. A microswitch 20 is also fixed on the bracket 16, and its actuating part 20a is adapted to be pressed by the back of the end portion 18 of the leaf spring 17, at all times except when, as illustrated in FIG. 4, the cutaway portion 15 has turned so that the portion 19 enters it. The microswitch 20 is connected to an alarm lamp 21, a cancelling switch means 22, the ignition switch 23, and the battery of the vehicle 24.

Figure 3:
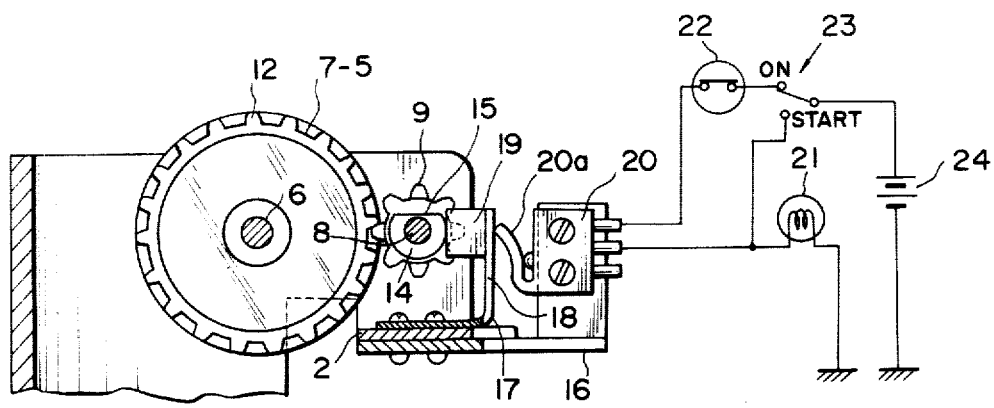
FIG. 3 is a schematic cross-sectional view along the line X—X in FIG. 2.
Figure 4:
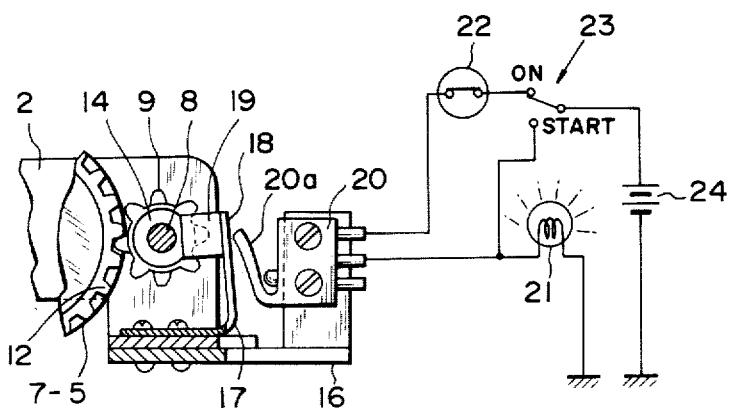
FIG. 4 is a view similar to FIG. 3, showing the alarm system in the "ON" state.

Thus, normally the switch 20 is pressed by the end portion 18 of the leaf spring 17, and is discontinuous as shown in FIG. 3, but, when the vehicle has covered a predetermined mileage, as shown in FIG. 4, then the portion 19 enters the cutaway 15, and the switch 20 is no longer pressed by the end portion 18, and is therefore continuous. Thereby the lamp 21 lights, to indicate that the said predetermined mileage has been covered.

The ignition switch 23 of the vehicle is usually, during the operation of the vehicle, set to the "ON" position. However, during cranking of the vehicle, this switch is at the "START" position, and at this time current is directly supplied to the lamp 21, so that the lighting up of this lamp at this time may be employed to check that the lamp is in good order.

Figure 5:
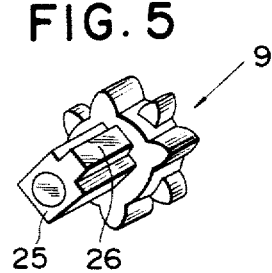
FIG. 5 is a perspective view, showing a modified form of the triggering means.

Instead of the triggering means being a cutaway, a different means could be used, as long as it rotates together with its carry pinion. For instance, in FIG. 5, there is shown a modified embodiment, in which the boss 25 of a carry pinion 9 is formed square, and the projection 26 is formed on it for actuating the microswitch 20. When the bosses of pinions 9 have square cross sectional areas as above, the figures on the integrating wheels 7-1 through 7-6 can be quickly aligned on one straight line (e.g. for the prevention of errors by backlash of gears) by pressing one plane of the boss 25 by an elastic member such as a leaf spring (not shown).

Figure 6:
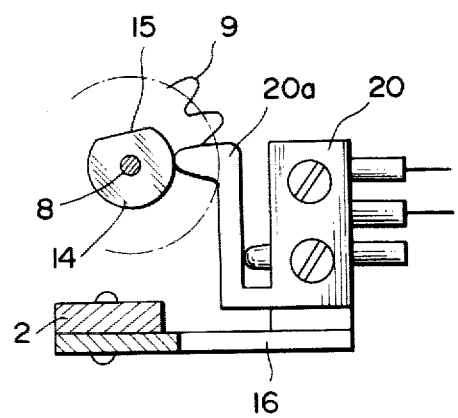
FIG. 6 is an explanatory view, similar to a part of FIG. 3 or FIG. 4, showing still another embodiment of the present invention.

FIG. 6 shows still another embodiment of the present invention, in which the leaf spring 17 is omitted, and the microswitch 20 is directly actuated by the triggering means.

Another possible embodiment would be to provide the triggering means as a stepped portion formed on one side of the carry pinion, instead of on its boss.

Although the invention has been shown and described with reference to several preferred embodiments thereof, it should not be considered as limited to these, however, or mere and simple generalizations, or other detailed embodiments. Yet further alterations could be made to the form and the detail of any particular embodiment, without departing from the scope of the present invention, which it is therefore desired should be delimited solely by the accompanying claims, which follow.

What is claimed is:

1. In a vehicle odometer comprising a frame, two parallel shafts, supported by the frame, a plurality of distance-indicating wheels mounted on one of the shafts, and a plurality of carry pinions mounted on the other shaft, which actuate the distance-indicating wheels, an alarm device including:

triggering means which rotates together with one of said carry pinions, said triggering means being integrally formed on a boss part of said carry pinion, a bracket fixed to the frame of the odometer;

a leaf spring having one end thereof fixed to said bracket, and a second end thereof having a protruding portion adapted to engage said boss part of said carry pinion and said triggering means by the biasing force of said leaf spring; and a switch means fixed to the bracket, an actuating portion of said switch means extending toward the second end of said leaf spring and adapted to be normally depressed by said leaf spring at all times except when said triggering means engages said protruding portion at the second end of said leaf spring.

2. The device of claim 1, wherein said switch means includes a microswitch.

3. An alarm device of claim 2, further comprising:

cancelling switch means connected to said microswitch;

an alarm lamp responsive to said microswitch;

a battery;

a vehicle ignition switch, connected to said cancelling switch means, said ignition switch being set to an "ON" position during normal running and set to a "START" position during vehicle cranking, battery current being thereby supplied to said alarm lamp to check that said alarm lamp is operational.

4. An alarm device of claim 1 or 3, wherein said triggering means comprises a stepped portion of said boss part of said carry pinion.

5. An alarm of claim 4, wherein said stepped portion of said boss part is flat.

6. An alarm device of claim 4, wherein said flat portion of said boss part is established by a cut out portion formed in said boss part.

7. An alarm device of claim 1 or 3, said boss part being square, and said triggering means comprising a projection extending from said square boss.

8. An alarm device of claim 2, further comprising an alarm lamp connected to said microswitch.

9. An alarm device of claim 2, including a cancelling switch and an ignition switch in circuit with said microswitch.

* * * * *